United States Patent [19]

Bitzer et al.

[11] 3,743,767

[45] July 3, 1973

[54] TRANSMITTER AND RECEIVER FOR THE TRANSMISSION OF DIGITAL DATA OVER STANDARD TELEVISION CHANNELS

[75] Inventors: Donald L. Bitzer, Urbana; Michael Johnson, Paxton; Jack Stifle, Champaign, all of Ill.

[73] Assignee: University of Illinois Foundation, Urbana, Ill.

[22] Filed: Oct. 4, 1971

[21] Appl. No.: 186,020

[52] U.S. Cl. ............ 178/5.6, 178/6.8, 178/DIG. 23, 178/DIG. 13

[51] Int. Cl. ............ H04n 7/00

[58] Field of Search ............ 178/5.6, 6.8, DIG. 13, 178/DIG. 23

[56] References Cited

UNITED STATES PATENTS

| | | | |
|---|---|---|---|
| 3,493,674 | 2/1970 | Houghton | 178/DIG. 23 |
| 3,046,331 | 7/1962 | Gebel | 178/6.8 |
| 3,649,750 | 3/1972 | Gibson | 178/DIG. 23 |

*Primary Examiner*—Richard Murray
*Attorney*—Charles J. Merriam et al.
*Attorney*—Charles J. Merriam, Nate F. Scarpelli et al.

[57] ABSTRACT

Apparatus and a method for the economical distribution of digital data to a number of data terminals using standard commercial television channels including a digital transmitter for transmitting digital data over a video cable and a receiver for receiving the transmitted digital data and selectively distributing the recovered data to the desired data terminals. A method for sending digital data bit by bit over television channels in a field by field manner to a plurality of terminals in a manner such as to greatly simplify the detection of any errors and offering an advantage of decreasing the probability of errors as more data terminals are added to the system.

8 Claims, 11 Drawing Figures

INVENTOR
Donald L. Bitzer
Michael Johnson
Jack Stifle
BY
Merriam, Marshall, Shapiro & Klose
ATTYS.

INVENTORS
Donald L. Bitzer
Michael Johnson
Jack Stifle
BY
Merriam, Marshall, Shapiro & Klose
ATTYS.

INVENTORS
Donald L. Bitzer
Michael Johnson
Jack Stifle
BY
Merriam, Marshall, Shapiro & Klose
ATTYS.

INVENTORS
Donald L. Bitzer
Michael Johnson
Jack Stifle
BY
Merriam, Marshall, Shapiro & Klose
ATTYS.

INVENTORS
Donald L. Bitzer
Michael Johnson
Jack Stifle
BY
Merriam, Marshall, Shapiro & Klose
ATTYS.

INVENTORS
Donald L. Bitzer
Michael Johnson
Jack Stifle
BY Merriam, Marshall, Shapiro & Klose
ATTYS.

TRANSMITTER AND RECEIVER FOR THE TRANSMISSION OF DIGITAL DATA OVER STANDARD TELEVISION CHANNELS

This invention relates to digital data communications, and more particularly to apparatus and a method for transmitting and receiving digital data such as supplied by a computer using standard commercial television channels.

It has become extremely desirable to be able to send and distribute digital data from a single source, such as a computer to a number of receivers or users at computer terminals. As an example, in the computer-assisted instruction system developed at the University of Illinois (commonly known as the PLATO system) up to 4,000 remote computer terminals, each requiring a nominal 1200 bits per second bps channel are to be connected to a centrally located computer. Reference may be made to Donald L. Bitzer U.S. Pat. No. 3,405,457, assigned to the same assignee herein describing one embodiment of the PLATO system. In such a system, voice grade telephone lines could serve as the 1200 bps communication channel. However, in systems involving more than 1000 terminals, it becomes especially important to obtain economical distribution of the digital data to the terminals. The intrastate tarriffs for leasing such voice grade lines range from about 50 per mile per month per line for a service involving 240 channels to about $4.50 per mile per month for a single line.

On the other hand, the tariffs for an intra-city educational television (ETV) channel range from approximately $30 per mile per month downward with the number of channels leased. Such a channel would distribute digital data to computer terminals in class rooms in a manner not unlike the distribution of commercial television programs, via CATV systems to private homes. In such a system one ETV channel could provide 1200 bps service to more than 1000 terminals resulting in a per terminal charge for the channel of less than 5.5 per mile per month.

SUMMARY OF THE INVENTION

In accordance with the principles of the present invention there is provided apparatus and a method for the economical distribution of digital data to a number of data terminals using standard commercial television channels. The data is transmitted in a synchronous time-division multiplex mode which is compatible with standard television practice, therefore providing low cost input and distributions equipment. In addition, the particular format of the digital data within a television field as described hereinafter, greatly simplifies the detection of any errors and the distinct advantage of decreasing the possibility of error as more data terminals are added to the system.

Thus, the present invention provides the following advantages:

1. Compatible transmission and reception with television standards;

2. May be used in standard CATV systems;

3. Ease of error detection;

4. Decreasing error possibilities with addition of more terminals; and

5. Low cost input and data distribution.

DETAILED DESCRIPTION OF A PREFERRED EMBODIMENT

Figure 1:
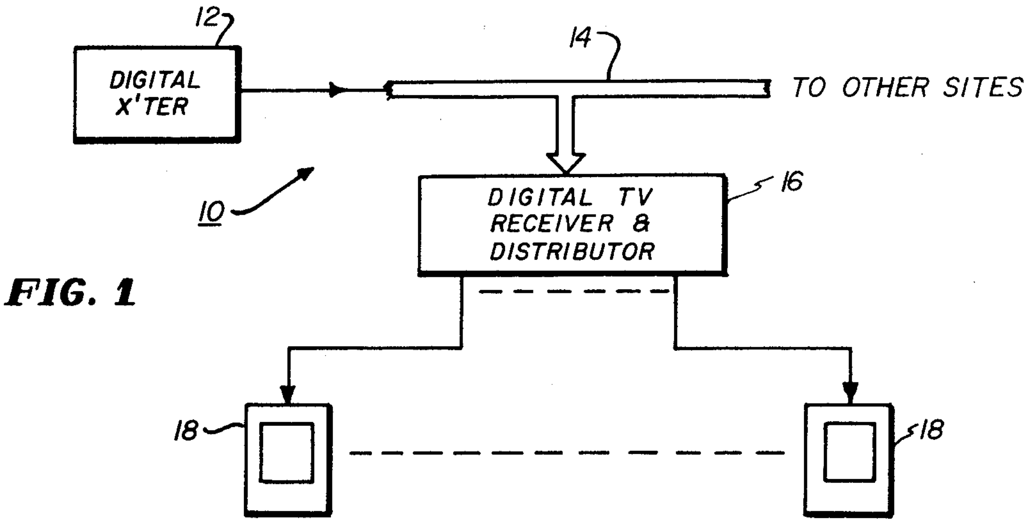
FIG. 1 is a schematic block diagram illustrating a transmitter and receiver system for distributing digital data via standard television channels from a data center to a number of data terminals.

Referring now to FIGS. 1–8, there is illustrated the apparatus and operation thereof of one embodiment of the invention. In FIG. 1, the overall system 10 of the invention is shown, including a digital transmitter 12 for transmitting digital data over a video cable 14 in a mode compatible with standard commercial television practice, and a receiver 16 for receiving the transmitted digital data and selectively distributing the recovered data to the desired data terminals 18.

The data terminals 18 comprise, for instance, student terminals each having a display device such as a cathode ray tube or a plasma panel as disclosed in the D. L. Bitzer et al. U.S. Pat. No. 3,559,190 assigned to the same assignee here. It is to be understood that the terminals 18 also include keysets, each communicating through a keyset multiplexor and voice grade phone lines to a large scale, general purpose computer and the digital transmitter 12. This additional apparatus is mentioned here only for setting the environment within which the present invention is concerned, and thus has not been illustrated in FIG. 1, in order to avoid encumbering the drawings.

Figure 4:
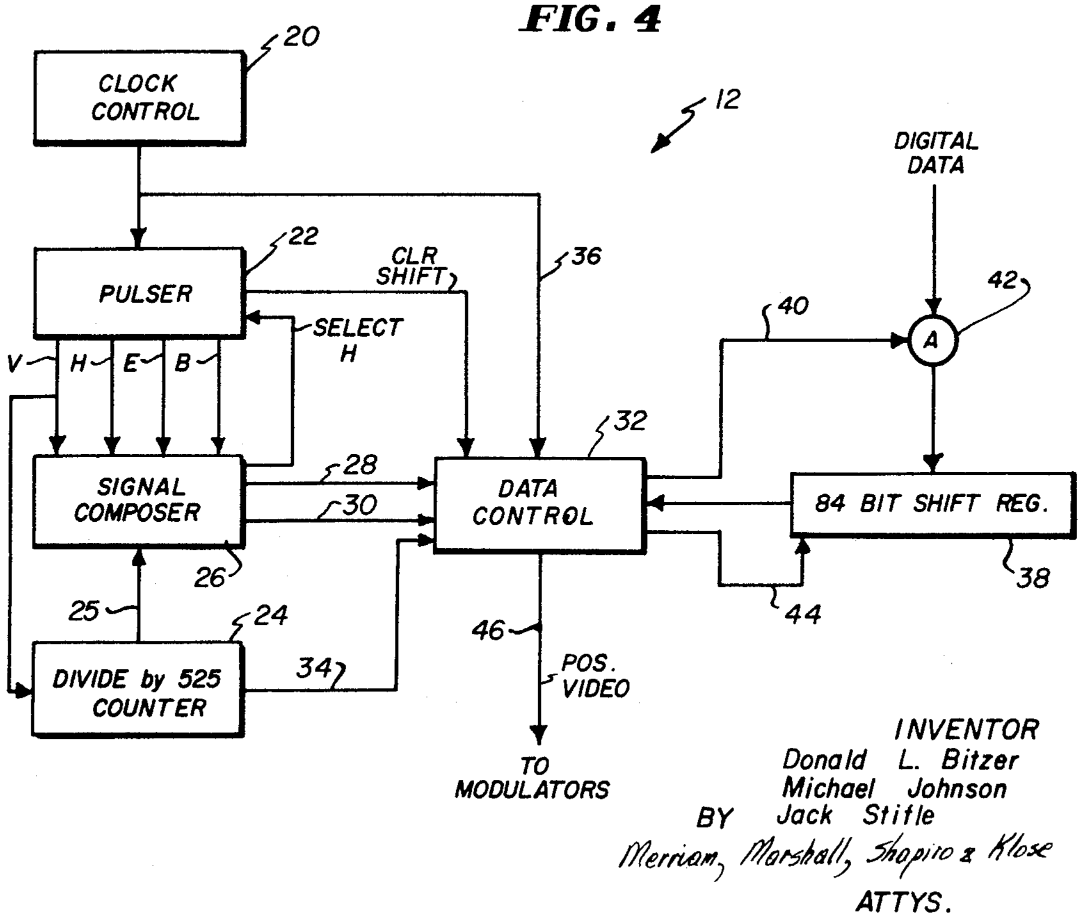
FIG. 4 is a block diagram schematically illustrating a transmitter in accordance with the present invention for transmitting digital data over standard television channels.
Figure 6:
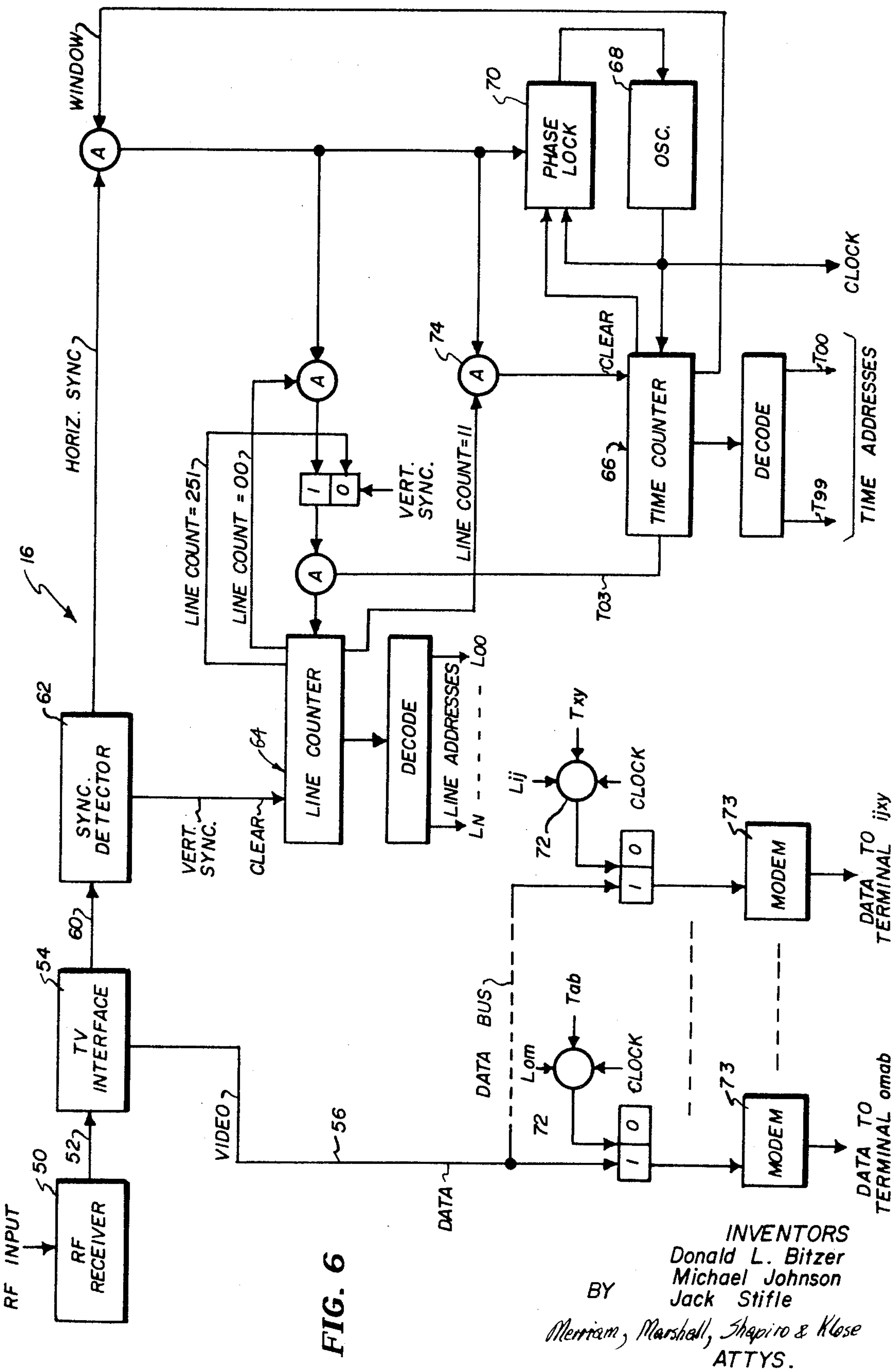
FIG. 6 is a schematic block diagram illustrating a receiver in accordance with the present invention for recovering the digital data from standard television channels and generating data addresses for sending the respective digital data to the required data terminal.
Figure 8:
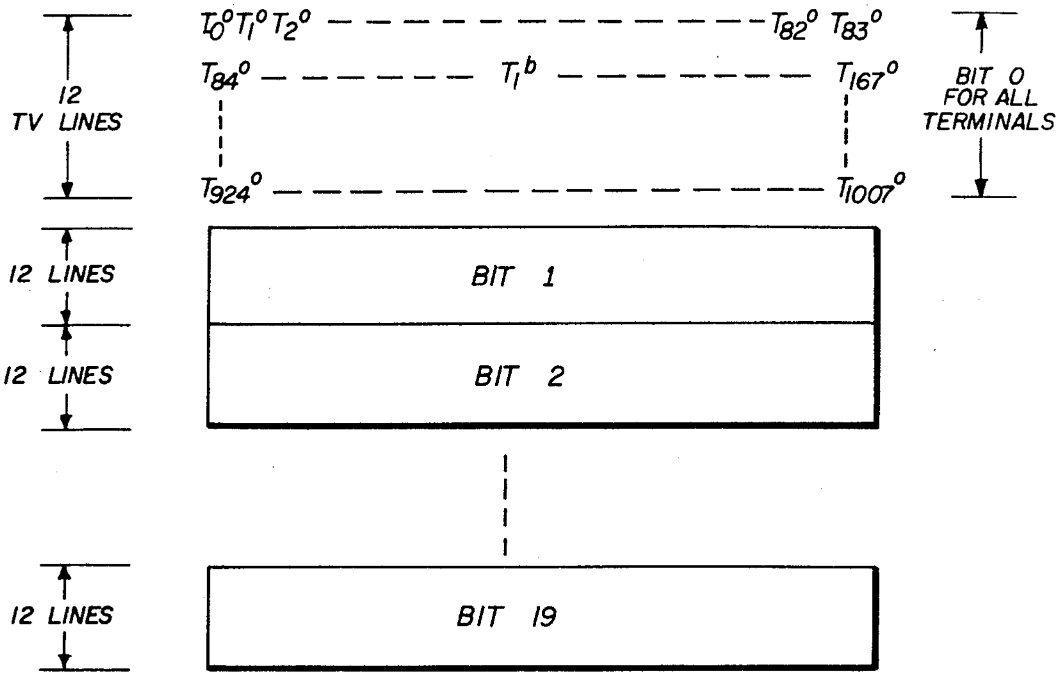
FIG. 8 is an illustration of the format for transmitting digital data within a television field in accordance with another aspect of the present invention.
Figure 9:
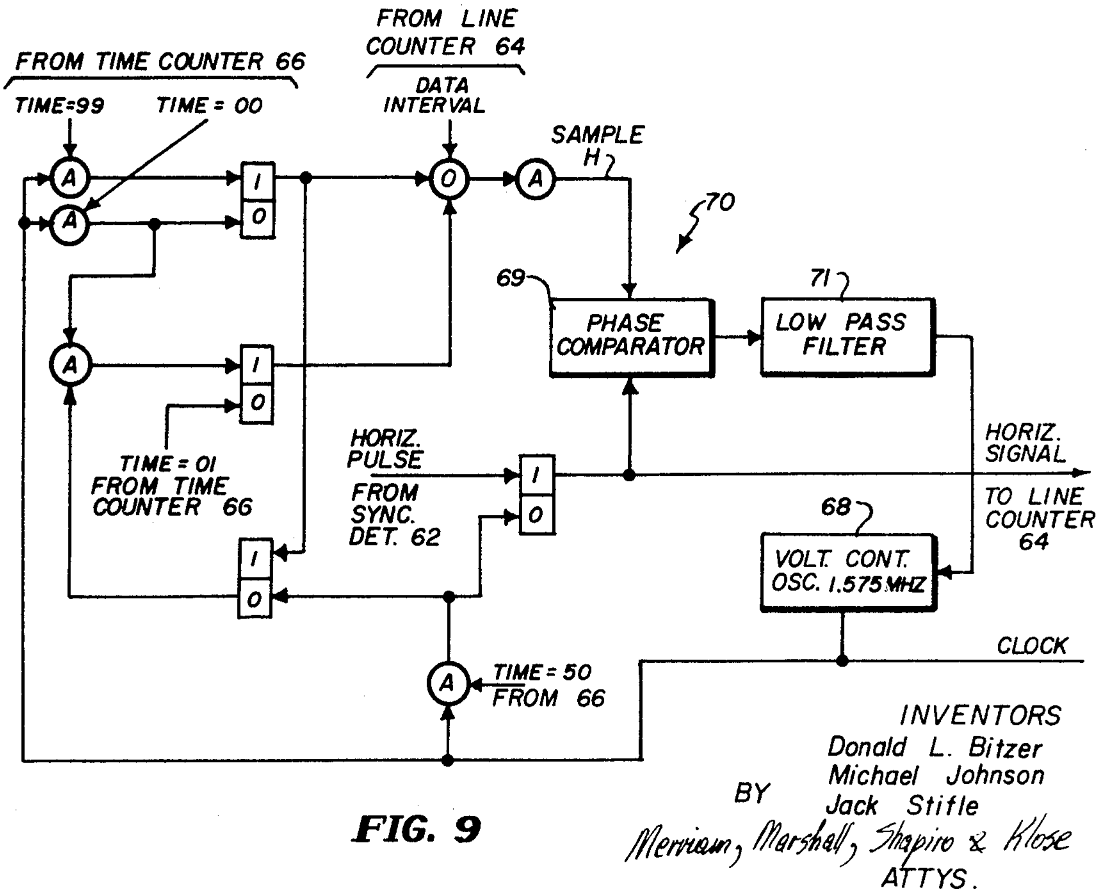
FIG. 9 illustrates the phase lock and oscillator components of the receiver-distributor 16.

Therefore, in an overall view of the drawings illustrating one embodiment of the invention:

FIG. 4 illustrates the components of the digital transmitter 12;

FIG. 6 shows the components of the receiver-distributor 16;

FIGS. 2, 3, 5 and 7 show the various control, timing and data signals for operating the apparatus;

FIG. 8 shows a television field, wherein in another aspect of this invention the format of the digital data has been entered in a novel manner for reducing data errors as the number of terminals 18 is increased; and FIG. 9 illustrates the phase lock and oscillator components of the receiver-distributor 16.

COMPOSITE TELEVISION SIGNAL

The composite television signal (black and white) is assembled from three signals. These are:

1. A composite synchronizing signal which is made up of two parts, a horizontal sync signal and a vertical sync signal;

2. A composite blanking signal which is also composed of two parts, a horizontal blanking signal and a vertical blanking signal; and 3. A video signal which contains the picture information. This signal is normally used by television receivers to intensity modulate the horizontal scanning lines. In the system described here the video signal contains the digital data.

SYNCHRONIZATION SIGNAL

Figure 2:
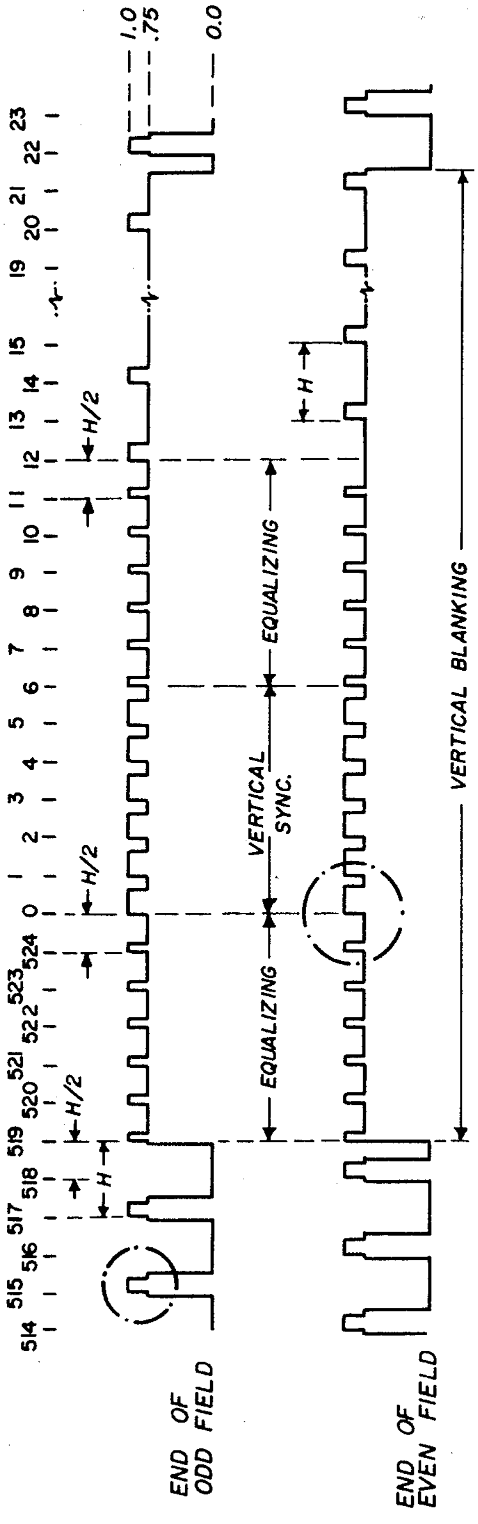
FIG. 2 is a representation of the FCC standard synchronization signals required for commercial television.
Figure 2A:
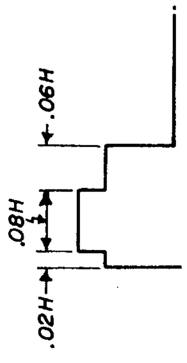
FIG. 2A is an expanded view of a portion of the horizontal blanking and synchronization interval shown in FIG. 2.
Figure 2B:
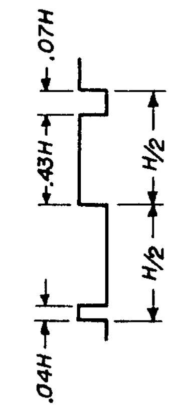
FIG. 2B is an expanded representation of a portion of the vertical synchronization and blanking interval shown in FIG. 2.

Details of the Federal Communications Commission (FCC) standard synchronization signal are shown in FIG. 2. All times are given relative to H, the time interval between horizontal sync pulses (H = 1/15750 sec = 63.2 microsec.). The vertical blanking time shown is the minimum allowed by FCC standards. The dashed line circled horizontal blanking and sync interval in the upper portion of FIG. 2 is more clearly shown in the expanded view of FIG. 2A. Similarly, the dashed line circled vertical blanking and sync interval in FIG. 2 is more clearly shown in the expanded view of FIG. 2B.

The equalization pulses and the serrating pulses in the vertical sync interval are of little value in the system described in this disclosure and therefore the reasons for their existence will not be discussed here. They must, however, still be generated by the digital transmitter 12, in addition to the illustrated FCC sync signals, in order that standard commercial equipment may be used for transmission and reception.

In the United States television system, there are 30 frames transmitted per second, each frame containing 525 lines. In FIG. 2 the lines zero to 23 are shown, continuing to lines 514–525 as shown at the left portion of FIG. 2. To reduce flicker in the picture, each frame is transmitted as two fields of 262-½ lines each at a rate of 60 fields per second, with the lines of one field interlaced between the lines of the other. The vertical blanking interval requires up to 21 lines (see FIG. 2) leaving a maximum of 241-½ lines to be used for video.

VIDEO (DATA) SIGNAL

Because digital information is binary in nature, only two voltage levels are required to represent the information. In the system described here the white level is chosen as logical "one" and the black level as logical "zero". An example of a line carrying digital data is shown in FIG. 3.

Figure 3:
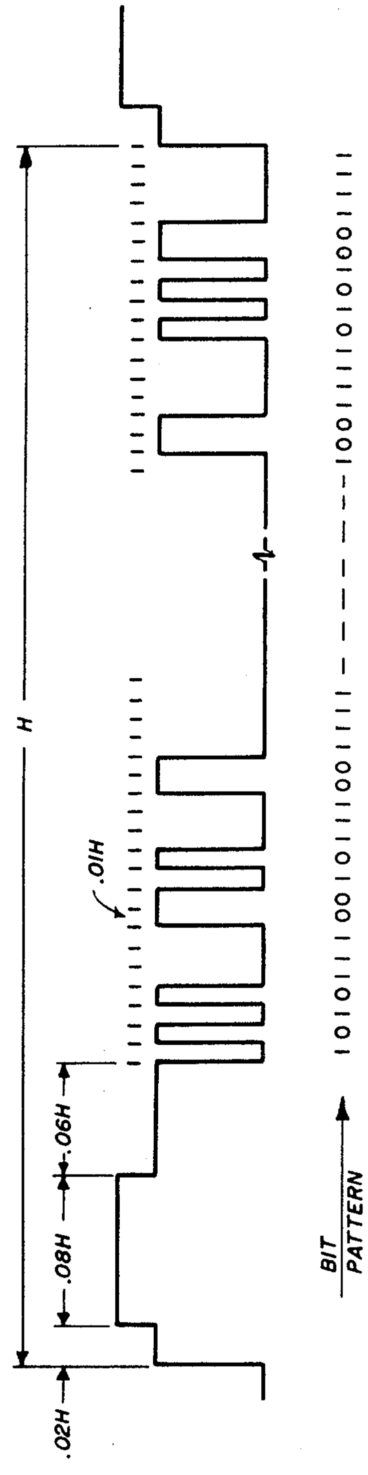
FIG. 3 is a representation of the composite signal in accordance with the present invention including digital data and containing the required synchronizing and blanking signals for commercial television channels.
Figure 5:
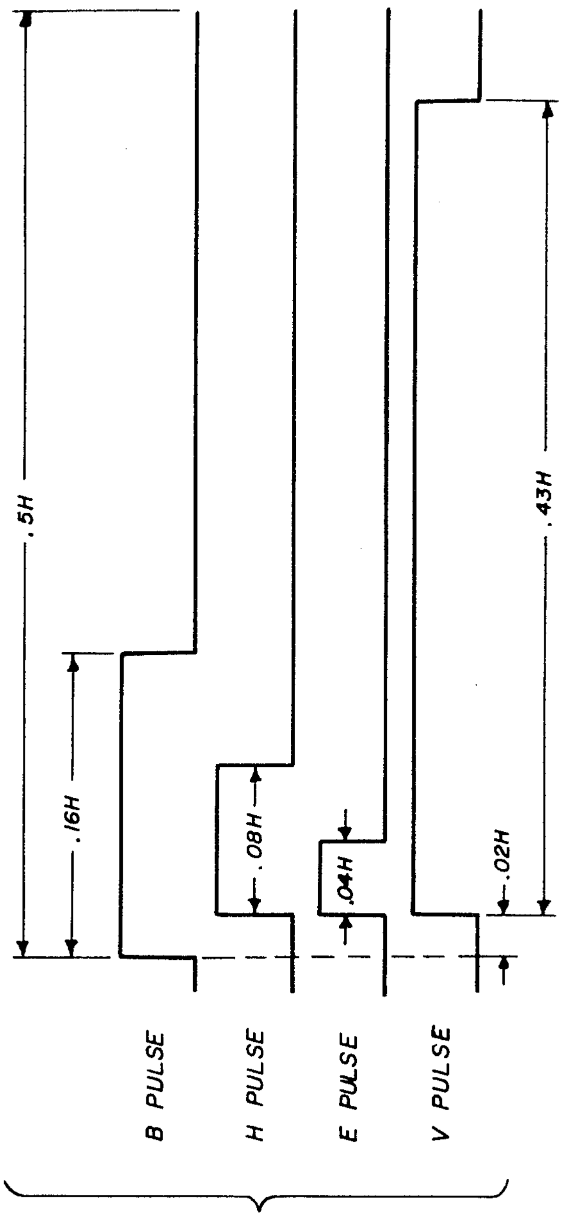
FIG. 5 is a representation of the pulses present at the output of the pulser unit shown in FIG. 4.

Each horizontal scanning line in the television field which carries data is divided into 100 time bins of 0.01H seconds each, as shown in FIG. 3. The first 16 bins of each line (0.02H + 0.08H + 0.06H) are used for horizontal synchronization and blanking purposes while each of the remaining 84 bins contains a bit of digital information.

DIGITAL TRANSMITTER

The digital transmitter 12 generates the standard television synchronization and blanking signals of FIG. 2 and combines these signals with the digital data into a composite signal compatible with FCC standards, one such line signal being shown in FIG. 3. The composite signal is then delivered to the common carrier supplying the television channel for RF modulation and transmission over standard cable television (CATV) equipment.

A block diagram of the compatible television-digital transmitter apparatus 12 is shown in FIG. 4.

A clock control circuit 20 contains a 1.575 MHz crystal controlled oscillator (clock) which drives a divide by 50 counter. The outputs of the counter and the clock signal are sent to a pulser circuit 22 where they are used to generate the four pulses — V, H, E and B shown in FIG. 5.

In a constructed embodiment of the invention, the divide by 50 counter and pulser comprised conventional logic circuits, many in the form of integrated circuits readily available in the industry. As an example, the following may be utilized, it being understood that other equivalent specific components and logic circuits may be readily employed by those skilled in the art in accordance with the teachings herein to practice the invention and yet fall within the scope of the invention (commercially available integrated circuit numbers are indicated where applicable):

1. Decade counters (two required-one wired as divide/5) — No. 7490.

2. BCD to Decimal Decode (two) — No. 7442.

3. Combinational Logic - Including two - No. 7420.

4. Flip-flop circuits (one for each V, H, E, B pulse and Clear Shift).

The V pulse is used to drive a divide by 525 counter 24, comprising standard flip-flop and gate circuits, the outputs of which, including odd and even field designations, are interpreted as the horizontal line count within a frame. The line count is shown at the top of FIG. 2 as previously indicated.

the signal composer circuit 26 assembles the composite synchronization and blanking signals using the four pulses supplied by the pulser circuit 22 as building blocks. The outputs of the divider by 525 counter 24 on line 25, including signals representing the horizontal line count and odd and even field signal designations, are used by the signal composer 26 to supervise assembly of the composite signals.

In particular, one output line 28 couples the composite horizontal and vertical sync signal while another output line 30 couples the composite horizontal and vertical blanking and the horizontal blanking to the data control circuit 32. Output line 34 of the counter 24 supplies the correct data interval for formation of the composite sync, blanking and data signal.

A constructed signal composer 26 comprised a combinational logic circuit including integrated circuit Nos. 7400, 7410 and 7420 for receiving the horizontal line count designations from line 25, and standard gate and flip-flop circuits for combining the output of the combinational logic circuit with the V, H, E and B pulses and the odd and even field designations to provide the composite sync, composite blanking, vertical and horizontal blanking, and Select H signals.

The composite sync, blanking and data interval signals along with a 1.575 MHz (period=0.01H) clock signal on output line 36 are sent to the data control circuit 32 which performs two functions:

1. The generation of the timing and control signals necessary for the transfer of digital data into the transmitter; and

2. The assembly of the data, the sync, and the blanking signals into a composite signal.

The digital data to be transmitted is assumed to be in the form of 84 bit words. At the start of each line a data word is loaded into the shift register 38 by a data transfer signal on output line 40 through gate 42. At the conclusion of the horizontal blanking interval the data is shifted into the data control circuit 32 by a shift (1.575 MHz) signal supplied on output line 44. Standard flip-flop and gate circuits under control of the aforementioned signals, and as shown in FIG. 4, provide this data transfer operation. The composite signal comprising composite sync, composite blanking and data coupled through a respective current source and switch is then sent on output line 46 to standard television RF modulators for transmission over standard television channels.

RECEIVER

Two basic functions are performed by the data receiver 16, (*a*) the recovery of the digital data, and (*b*) the generation of data addresses. This latter function is necessary to facilitate separation of the data when it is transmitted in a time-division-multiplex mode and must be delivered to multiple destinations.

A block diagram of the data receiver 16 is shown in FIG. 6. An RF receiver 50 similar to the front end of a standard commercial television receiver is used to recover the composite video signal from the input RF carrier. The composite signal on line 52 is delivered to the TV interface circuit 54 where it is clamped and then separated into sync and video (data) components. The video signal on line 56 is placed on the data bus 58 while the composite sync signal on line 60 is sent to the sync detector circuit 62.

The sync detector circuit 62 including two integrator/comparators separates the vertical and horizontal sync signals and supplies these signals to the data addressing circuits.

Data addresses are specified by:

a. a line address designating the television field line on which a data bit occurs; and b. a time address specifying the time bin along that field line which contains the data bit.

The line address is specified by a line counter 64 which effectively counts horizontal sync pulses. The time address is obtained from the time counter 66 which is driven by a 1.575 MHz oscillator 68. This oscillator is phase locked by a phase lock circuit 70 to the horizontal sync pulse and provides an accurate source for strobing the data bins along a field line. The lower left hand part of FIG. 6 shows how a particular bit of data may be recovered from the data stream through line and time address gates 72 for transmission to a respective data terminal through a data modem 73. The data modem converts the respective digital data on data bus 58 into a form suitable for the particular terminal, and may not be needed where the terminal can directly utilize digital data. Thus, although the data modem 73 is not a part of the present invention, reference may be made to a copending application entitled "Data Modem", U.S. Ser. No. 160,429, assigned to the same assignee here, which describes a data modem.

RECEIVER SYNCHRONIZATION

Figure 7:
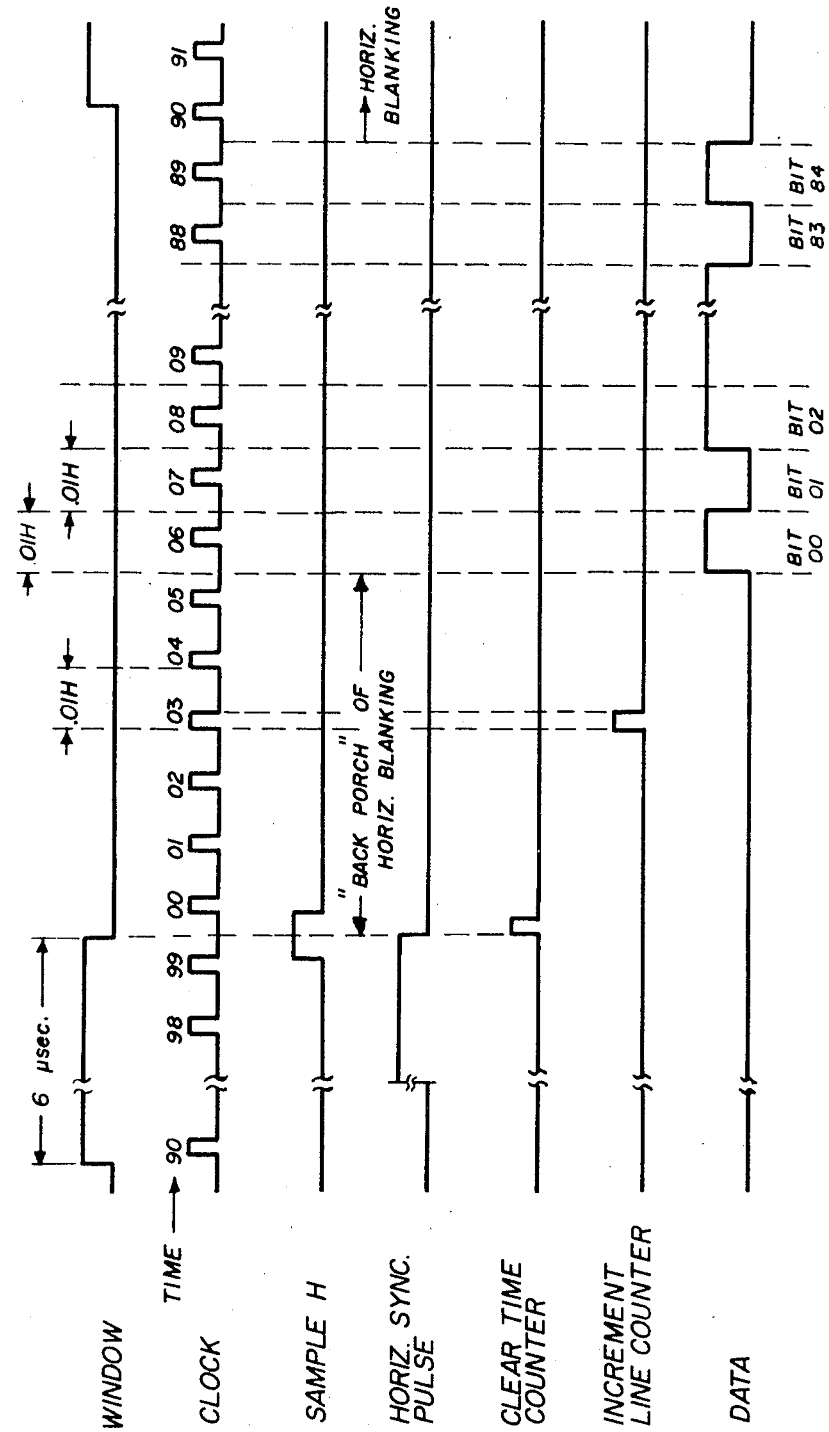
FIG. 7 is a timing diagram controlling the receiver synchronization with respect to the incoming composite television signal containing the digital data.

Sucessful recovery of the incoming digital data in television format depends upon the synchronization of the addressing circuits with the incoming signal. The details of receiver synchronization are shown in FIG. 7.

The horizontal sync signal is viewed by the addressing circuits through a 6 microseconds window. This window is initiated by the clock time 90 ($T_{90}$) from the 1.575 MHz clock and terminated by the trailing edge of the incoming horizontal sync pulse. Between clock time 99 and 00 a sample H pulse is generated by the time counter 66 and is used to sample the horizontal sync signal as seen through the window. During this sample H interval the frequency of the 1.575 MHz oscillator 68 is adjusted such that the oscillator 68 remains phase locked to the trailing edge of the horizontal sync pulse. At the conclusion of the horizontal sync pulse a clear time counter pulse is generated (see FIG. 7) which sets the time counter 66 to zero thus placing the counter "in step" with the train of sync pulses.

Reference may be made to FIG. 9 wherein there is illustrated the phase comparator 69, low pass filter 71 and the interconnection of various gate and flip-flop circuits for adjusting the frequency of oscillator 68 as described above.

The line counter 64 is not actually incremented by the horizontal sync pulse but instead by an increment line counter pulse at clock time 3 from the time counter 66. Noise which may be present in the horizontal sync signal is thus prevented from entering false counts into the line counter. It is apparent, of course, that noise present on the sync signal during the window interval can still cause errors by generating erroneous clear pulses. The window, however, is open only for 6 microseconds per line, and the clearing of the time counter 66 (generation of the clear pulse from gate 74) is permitted only for the first 12 horizontal sync pulses in a field plus approximately 3 lines following the vertical sync pulse. The addressing circuits are thus exposed to the horizontal sync signal for approximately $$3/262.5 + 6/63.5 \quad 12/262.5 \times 100 = 2 \text{ percent}$$

of the time.

Except for the vertical sync interval, the phase-locking operation occurs for every line in a field.

In the constructed embodiment of this invention, the line counter comprised standard flip-flop and gate circuits, as well as a nine stage binary counter formed of integrated circuits Nos. 7473 and 7493. The decoded circuit included integrated circuits Nos. 7442, 7402, 7410 and 7400. The time counter included two decade counters, formed of integrated circuit No. 7490, and the associated decode circuit comprised two BCD to decimal decode, integrated circuit No. 7442, and a combinational logic, including integrated circuit No. 7402.

FORMAT OF TELEVISION FIELD

Referring now to FIG. 8 there is illustrated the beginning and ending portions of the 240 line television field and the format of presenting digital data in the field in accordance with this invention. As shown in FIG. 8, each terminal bit $i$ of a data word within the first 12 lines of the field, followed by bit $i+1$ within the next 12 lines, etc. As illustrated, data terminal $T_0$ receives the first bit 0 ($T_0^0$); the second terminal $T_1$ then receives its first bit 0 ($T_1^0$), etc. The data transmission continues in the first line of the television field until terminal 83 has been presented with its bit 0 ($T_{83}^0$). The bit 0 for all terminals is thus sequentially transmitted within the first 12 lines in the television field. As shown in FIG. 8, during the next 12 lines the next respective bit (bit 1) for each terminal is sequentially transmitted as previously described for the first 12 lines. This format continues with bit 2 for all terminals transmitted during the next 12 lines, unitl bit 19 is transmitted to all of the terminals to complete the TV field.

It must be noted that a distinct advantage results from utilizing the format shown in FIG. 8. Specifically, if spurious noise occurs during the transmission time within the first 12 lines, for instance, only bit 0 for all of the terminals may be lost. Thus, in this system the noise burst would have to be at least 12 lines in duration (each line is 63.5 microseconds) to eliminate one bit from the terminals. In fact, one unique feature of this aspect of the invention is that the error probability decreases with an increase in terminals, since if we doubled the number of terminals it would take a noise burst of 24 lines duration to eliminate one bit from each terminal.

The format shown in FIG. 8 is developed from the fact that the data rate for the system is given by $60N_LN_B$ bits per sec.; where $N_L$ is the number of teleivision lines per field carrying data; and $N_B$ is the number of bits per television line.

In the system described here, 240 television lines per field, each containing 84 bits are used, giving a data rate of $1.2096 \times 10^6$ bps. In a PLATO type system as previously mentioned, each data terminal 18 operates on a word size of 20 bits in length and requires up to 60 words per second, or a data rate of 1200 bps. Therefore, one television field as shown in FIG. 8 can supply data to 1,008 terminals.

In a general digital data transmitting system according to the present invention, the following relationships can be given:

$$B_F = T_R/60;\ L_B = 240/B_F;\ \text{and}\ N_T = (84)\ L_B,$$

where: $T_R$ is the terminal operating rate in bps; $N_T$ is the number of terminals per TV channel; $B_F$ is the number of bits transmitted per TV field per terminal; and $L_B$ is the number of TV lines required to send a bit to all terminals.

The aforementioned advantage in error reduction of this invention becomes even more pronounced if a transmitting device is used that has a slower transmission rate than the illustrated 1200 bps here, since we could spread the transmission over the entire 12 or more lines. For instance, in a teletypewriter system which can send information out at approximately 110 bps, the transmission rate would be about 1/10 of the 1200 bps rate of the present system. Therefore, using the same system as we have here, up to 10 times as many terminals (10,080) can be serviced with the same error rate as the present 1200 bps, 1080 terminals. That is, with teletypewriters running about 110 bps (or about 120 bps for computation), we could use 2 bits per field or about 120 lines per bit and obtain 10,080 terminals.

While the actual apparatus in terms of the circuits involved has been herein illustrated in block diagram form, such circuits are well known to those skilled in the art. For instance, reference may be made to "Pulse and Digital Circuits", Millman & Taub, McGraw-Hill Book Co., Inc., 1956, particularly pp. 505–534, wherein the principles and components of television transmission are described. As previously described, many of the illustrated components here are readily available as integrated circuits in the 7400 series. This is to be understood as only an example of the present invention and not as a limitation to this particular embodiment.

The foregoing detailed description has been given for clearness and understanding only, and no unnecessary limitations should be understood therefrom, as modifications will be obvious to those skilled in the art.

What is claimed is:

1. A system for transmitting and receiving digital data selectively distributable to a plurality of data terminals, utilizing composite line scan horizontal and vertical synchronization (sync) and blanking signals for a teleivision field, compatible with commercial television practice, said system comprising:

means for generating said composite line scan horizontal and vertical sync and blanking signals for a television field;

clock control means for generating a timing signal dividing a line of said television field into discrete time intervals each associated with a respective data terminal;

data storage means for storing said digital data;

data control means receiving said composite sync and blanking signals, said digital data and said timing signal for providing a line scan television field signal compatible with commercial television practice;

said data control means including means for sequentially entering said digital data bit by bit into respective time intervals throughout said line of said television field in response to said timing signal, each bit associated for distribution to a respective data terminal;

a receiver for recovering said digital data from said television field signal for distribution to selected data terminals;

said receiver including means for separating said horizontal and vertical sync information from said television field signal;

means responsive to said horizontal sync information for generating respective line addresses;

phase locked oscillator means including oscillating means providing an oscillating signal at the same rate as said clock control means;

means responsive to said oscillating signal for generating time addresses of each of said discrete time interval in each line of said television field; and means responsive to a respective line and time address for coupling said data bits sequentially to respective data terminals.

2. A system as claimed in claim 1 wherein said clock control means includes an oscillator providing an output frequency with a corresponding period related to said discrete time intervals in each line of said television field.

3. A system as claimed in claim 1, including means responsive to said vertical sync signal for establishing the beginning of each field, said means further including a line counter activated by said vertical sync signal at the beginning of each field for providing output address signals corresponding to respective lines in each television field.

4. A system as claimed in claim 3, wherein said means responsive to said oscillating signal includes a time counter including means for utilizing said horizontal sync signal to phase lock said oscillating means to said clock control means.

5. A system as claimed in claim 3, wherein said phase locked oscillator means includes a phase comparator, and means for operating said phase comparator only during a predetermined period of each line in said television field.

6. A system as claimed in claim 5, including means for phase locking said phase locked oscillator once for every line in said television field.

7. A method for transmitting and receiving digital data bit by bit in a television field by television field manner and selectively distributable to a plurality of data terminals, utilizing composite line scan horizontal and vertical synchronization (sync) and blanking signals for a television field compatible with commercial television practice, said method comprising:

sequentially entering said digital data bit by bit into respective time intervals throughout a line of said television field, each bit associated for distribution to a respective data terminal;

providing a line scan television field signal compatible with commercial television practice, said signal including said composite sync and blanking signals and said sequentially entered digital data;

receiving said digital data from said line of said television field for distribution to selected data terminals;

sequentially addressing respective data terminals in response to said horizontal and vertical sync information from said line scan television field signal; and sequentially coupling said data bits to said respectively addressed data terminals.

8. A method for transmitting and receiving digital data selectively distributable to a plurality of data terminals, utilizing composite line scan horizontal and vertical synchronization (sync) and blanking signals for a television field, compatible with commercial television practice, said method comprising:

generating said composite line scan horizontal and vertical sync and blanking signals for a television field;

generating a timing signal dividing a line of said television field into discrete time intervals each associated with a respective data terminal;

storing said digital data;

receiving said composite sync and blanking signals, said digital data and said timing signal for providing a line scan television field signal compatible with commercial television practice;

sequentially entering said digital data bit by bit into respective time intervals throughout said line of said television field in respone to said timing signal, each bit associated for distribution to a respective data terminal;

recovering said digital data from said television field signal for distribution to selected data terminals;

separating said horizontal and vertical sync information from said television field signal;

generating respective line addresses in response to said horizontal sync information;

providing an oscillating signal at the same rate as said clock control means;

generating time addresses of each of said discrete time intervals in each line of said television field in response to said oscillating signal; and coupling said data bits sequentially to respective data terminals in response to a respective line and time address.

* * * * *

PO-1050
(5/69)

UNITED STATES PATENT OFFICE
CERTIFICATE OF CORRECTION

Patent No. 3,743,767 Dated July 3, 1973

Inventor(s) Donald L. Bitzer, et al.

It is certified that error appears in the above-identified patent and that said Letters Patent are hereby corrected as shown below:

Col. 1, line 29, "50" should be --50¢--.

Col. 1, line 43, "5.5" should be --5.5¢--.

Col. 3, line 32, "63.2" should be --63.5--.

Col. 4, line 50, "divider" should be --divide--.

Col. 7, line 3, after "terminal" insert --receives--.

Col. 7, line 16, "unitl" should be --until--.

Col. 7, line 33, "teleivision" should be --television--.

Col. 8, line 8, "505" should be --515--.

Col. 8, line 17, "and" (1st occurrence) should be --of--.

Col. 8, line 25, "teleivision" (1st occurrence) should be --television--.

Col. 8, line 59, "interval" should be --intervals--.

Signed and sealed this 5th day of March 1974.

(SEAL)
Attest:

EDWARD M.FLETCHER,JR.
Attesting Officer

C. MARSHALL DANN
Commissioner of Patents